(12) United States Patent
Bohne et al.

(10) Patent No.: US 7,854,649 B2
(45) Date of Patent: Dec. 21, 2010

(54) HAND-HELD POWER TOOL, IN PARTICULAR A SANDER

(75) Inventors: Ulrich Bohne, Kohlberg (DE); Eugene Hild, Aichtal (DE); Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 10/574,682

(22) PCT Filed: Jun. 22, 2005

(86) PCT No.: PCT/EP2005/052905

§ 371 (c)(1),
(2), (4) Date: Apr. 4, 2006

(87) PCT Pub. No.: WO2006/018343

PCT Pub. Date: Feb. 23, 2006

(65) Prior Publication Data

US 2008/0233846 A1  Sep. 25, 2008

(30) Foreign Application Priority Data

Aug. 13, 2004 (DE) .................. 10 2004 039 293

(51) Int. Cl.
*B24B 23/00* (2006.01)
(52) U.S. Cl. .................. 451/359; 451/356; 451/357; 451/456
(58) Field of Classification Search ............... 451/456, 451/354, 356, 357, 359
See application file for complete search history.

(56) References Cited

U.S. PATENT DOCUMENTS

| | | | | |
|---|---|---|---|---|
| 4,287,685 A * | 9/1981 | Marton | ................ | 451/359 |
| 4,660,329 A * | 4/1987 | Hutchins | ................ | 451/357 |
| 4,932,163 A * | 6/1990 | Chilton et al. | ................ | 451/359 |
| 5,105,585 A * | 4/1992 | Hampl et al. | ................ | 451/359 |
| 5,218,790 A * | 6/1993 | Huang | ................ | 451/359 |
| 5,445,558 A * | 8/1995 | Hutchins | ................ | 451/344 |
| 5,833,524 A * | 11/1998 | Satoh et al. | ................ | 451/456 |
| 5,919,085 A * | 7/1999 | Izumisawa | ................ | 451/357 |
| 5,993,305 A * | 11/1999 | Chu | ................ | 451/357 |
| 6,224,471 B1 * | 5/2001 | Clowers et al. | ................ | 451/359 |
| 6,454,640 B1 * | 9/2002 | Siedler et al. | ................ | 451/357 |
| 6,969,311 B2 * | 11/2005 | Chen et al. | ................ | 451/359 |
| 7,033,262 B2 * | 4/2006 | Takizawa et al. | ................ | 451/490 |
| 7,118,609 B2 * | 10/2006 | Valentini | ................ | 55/385.1 |

FOREIGN PATENT DOCUMENTS

| | | |
|---|---|---|
| DE | 90 02 801 | 8/1990 |
| GB | 2 321 207 | 7/1998 |
| WO | 01/15857 | 3/2001 |
| WO | 2004/030864 | 4/2004 |

\* cited by examiner

*Primary Examiner*—Eileen P. Morgan
(74) *Attorney, Agent, or Firm*—Michael J. Striker

(57) ABSTRACT

A hand-held power tool, in particular a sander, includes a housing (10) and a motor (12) located in the housing (10). A driven shaft (16) that extends from a face end (14) of the housing (10) is drivable by the motor (12). A suction conduit (18) extends at least partway through the housing (10). The suction conduit (18) opens as an intake at the face end (14) of the housing (10).

17 Claims, 5 Drawing Sheets

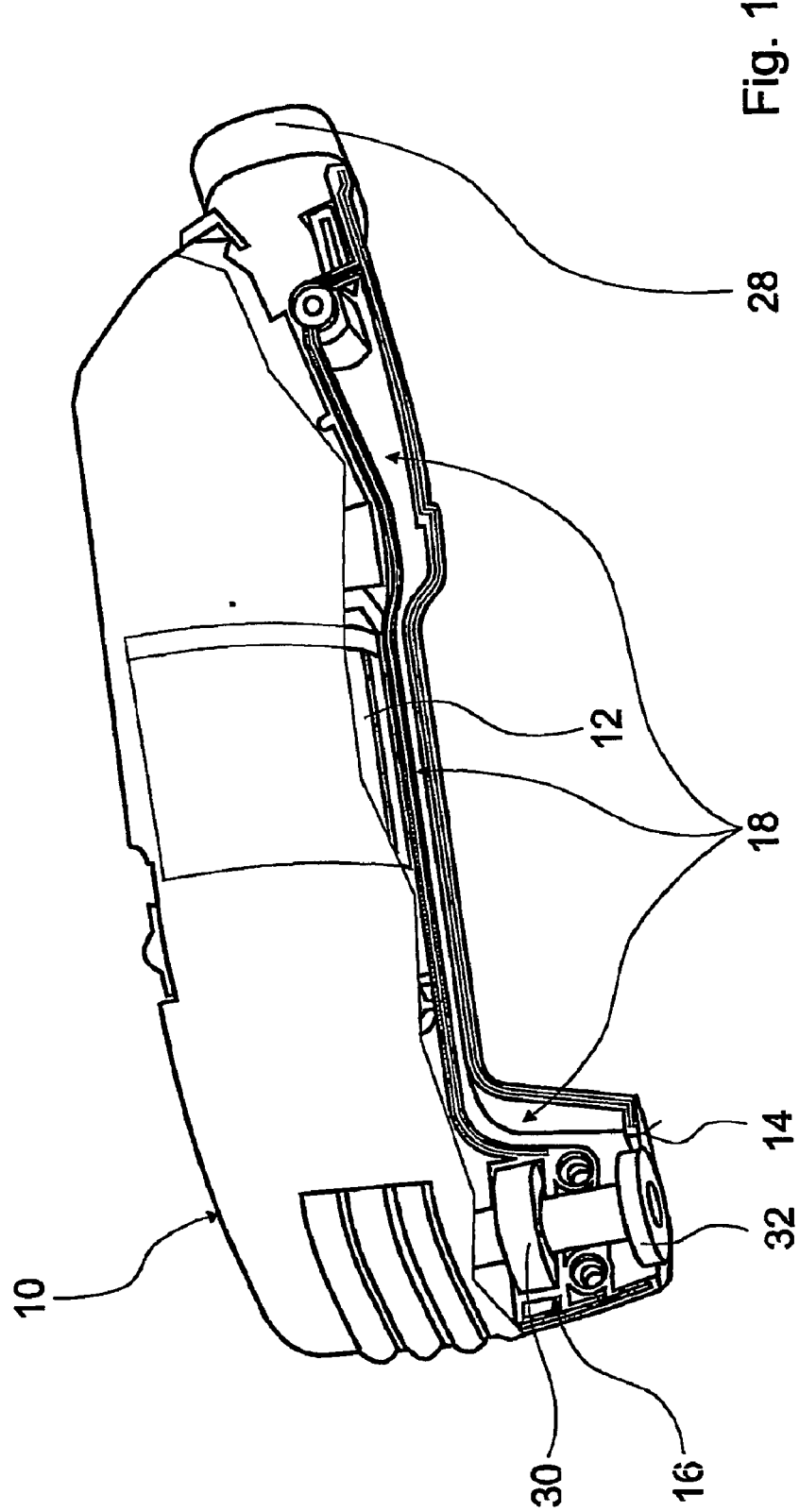

HAND-HELD POWER TOOL, IN PARTICULAR A SANDER

PRIOR ART

Figure 1A:
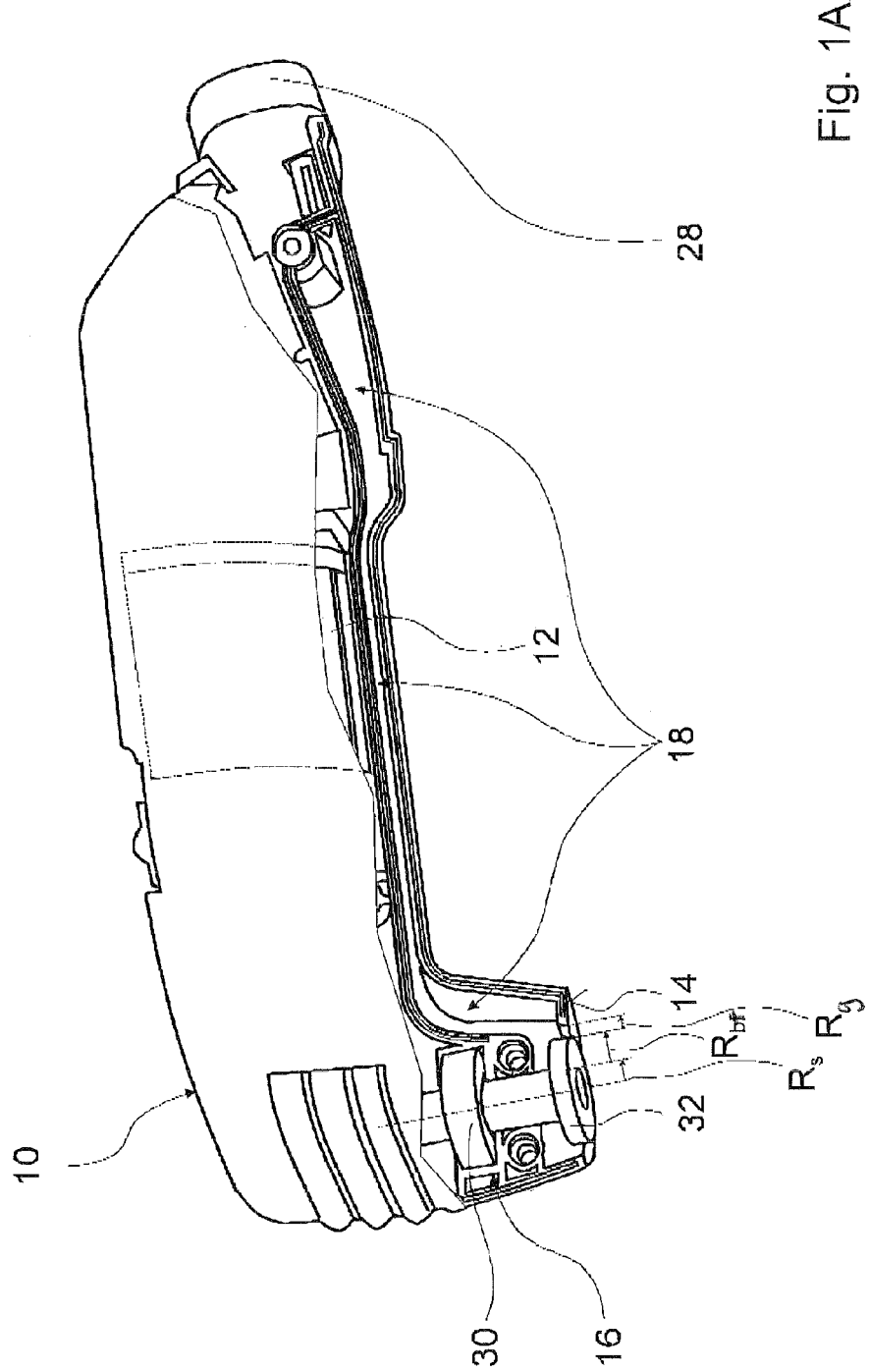

The invention is based in particular on a hand-held power tool as generically defined by the preamble to claim 1.

A hand-held power tool embodied as a so-called Delta sander is already known, with a housing and a motor located in the housing, by way of which motor a driven shaft, extending from one face end of the housing, can be driven. The hand-held power tool has a suction conduit, extending through the housing, which discharges on an underside of the housing, in the direction of the driven shaft, spaced apart from the face end of the housing. The suction conduit extending in the housing communicates, sealed off from the outside via an elastic adapter, with a suction conduit of a triangular tool receptacle, which is coupled to the driven shaft and is drivable via the driven shaft. The suction conduit of the tool receptacle is coupled, again sealed off from the outside, with a suction conduit of a triangular sanding plate, which is detachably secured to the tool receptacle and to which a sandpaper can be secured.

ADVANTAGES OF THE INVENTION

The invention is based on a hand-held power tool, in particular a sander, having a housing and a motor located in the housing, by way of which motor a driven shaft, extending from a face end of the housing, is drivable, and having a suction conduit, extending at least partway through the housing.

It is proposed that the suction conduit includes an intake opening at the face end, as a result of which especially advantageous suction extraction can be attained with only a few, or even without any, additional components.

If the suction conduit extends, in at least one region, by at least 180° and especially advantageously 360° around the driven shaft, an advantageous suction extraction that is uniform over a sanding face can be attained, and coincidence of the suction conduit with corresponding suction conduits can be assured in a simple way. In the region of the driven shaft, the suction conduit may be either undivided in its circumferential direction or subdivided into individual segments.

In a further feature of the invention, it is proposed that the suction conduit, in at least one region, has a spacing of less than 1 cm from the driven shaft, and especially advantageously in at least one region directly adjoins the driven shaft. As a result, despite the suction conduit, an advantageously small face end can be attained, making it possible to use the hand-held power tool handily even in corner areas, and furthermore, an advantageously large bearing area on the driven shaft for coupling to a tool receptacle can be attained, in order to achieve the smallest possible values of pressure per unit of surface area. In principle, however, it is also possible for the driven shaft to be separated from the suction conduit by a partition, as a result of which soiling of the driven shaft could be avoided.

In addition, a tool receptacle with at least one suction conduit is proposed, which is intended for installation in a hand-held power tool of the generic type here. The term "intended" should be understood in this context to mean in particular "especially equipped" and/or "designed". Moreover, the term "tool receptacle" should be understood in particular as a means for coupling to the driven shaft, such as in particular a tool receptacle to which a sanding plate can be secured, as is often the case for a Delta sander, or a sanding plate itself that can be secured directly to the driven shaft, as is often the case in hand-held power tools with an oscillating drive, and to which a sandpaper can be secured.

If the suction conduit in the tool receptacle has at least one transverse conduit segment which extends at least substantially parallel to a sanding plane, suction extraction can be attained flexibly from various regions of the sanding plane, particularly from a radially outer region toward the face end of the hand-held power tool. Moreover, conventional sanding sheets can be used, which radially outside the face end of the hand-held power tool have recesses for vacuuming out dust.

In a further feature of the invention, it is proposed that the transverse conduit segment is embodied as open in the direction toward the sanding plane, as a result of which especially simple manufacture can be attained, in particular without complicated gluing procedures or, in a casting process, without using cores. The tool receptacle can also be embodied in particular in one piece.

Furthermore, a system having a hand-held power tool in particular of the generic type in question, and with a tool receptacle with a suction conduit is proposed, wherein the suction conduit in the housing of the hand-held power tool and the suction conduit in the tool receptacle are intended for direct coupling. The term "direct coupling" should be understood in particular as a coupling without intervening, additional components. By means of the provisions according to the invention, it is possible in particular to dispense with additional adapters, installation space, weight, complicated installation, and expenses.

In a further feature of the invention, it is proposed that the suction conduit in the housing of the hand-held power tool and the suction conduit in the tool receptacle, in the installed state of the tool receptacle, are coupled via a region that is open toward the outside, as a result of which simple coupling without additional components can be attained, and in particular advantageous suction extraction of dust from an outer region of the suction conduit can be attained via the open region.

The provisions according to the invention can be employed in all hand-held power tools that appear suitable for the purpose to one skilled in the art, such as power drills, and preferably sanders, such as Delta sanders, eccentric sanders, and angle sanders, and especially preferably in hand-held power tools with an oscillating drive, in which an advantageous coincidence between the suction conduit in the housing of the hand-held power tool and the suction conduit in the tool receptacle can be achieved especially simply.

DRAWINGS

Further advantages will become apparent from the ensuing description of the drawings. In the drawings, one exemplary embodiment of the invention is shown. The drawings, description and claims include numerous characteristics in combination. One skilled in the art will expediently consider these characteristics individually as well and put them together to make useful further combinations.

Figure 2:
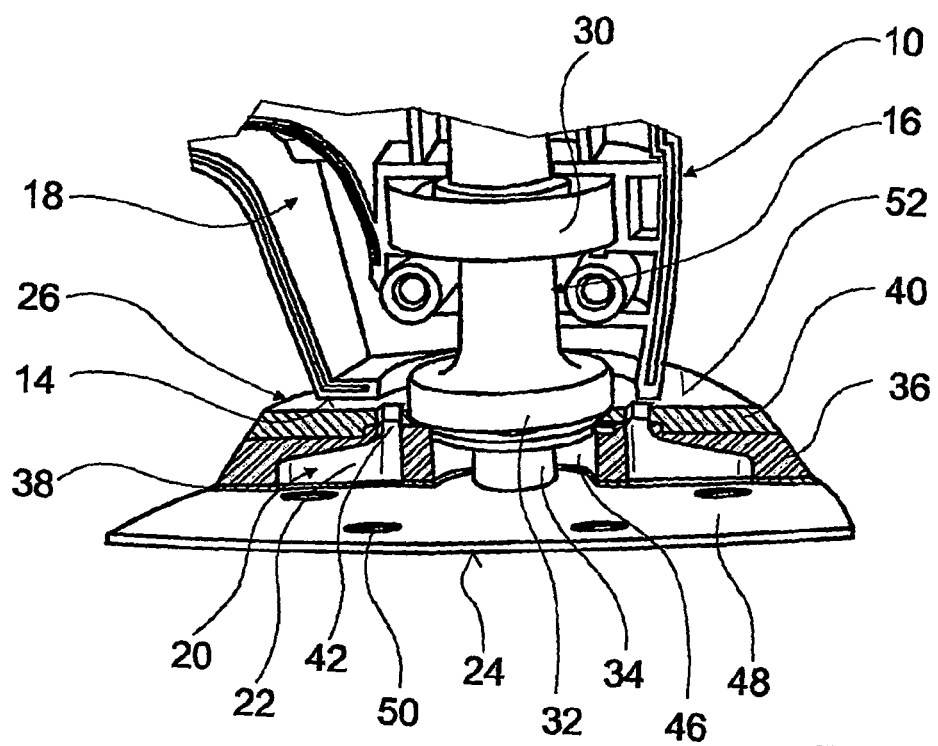
Figure 3:
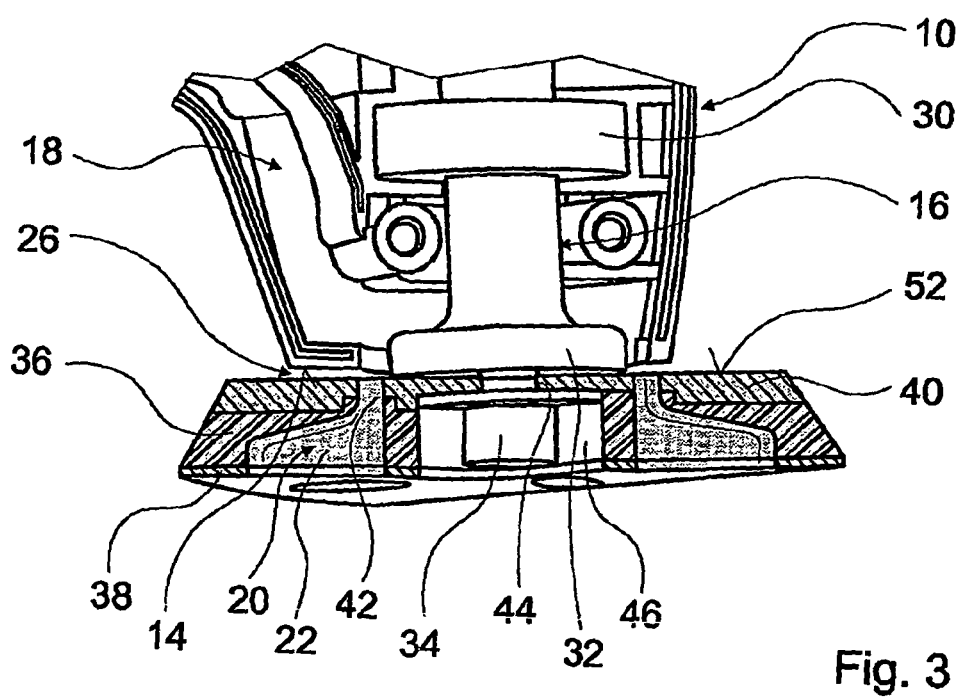
Figure 4:
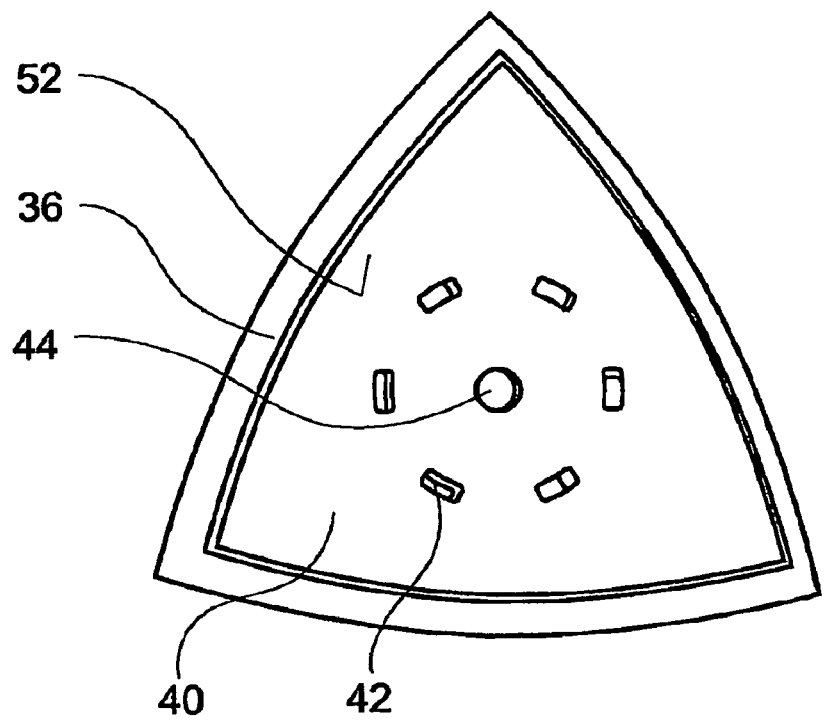
Figure 5:
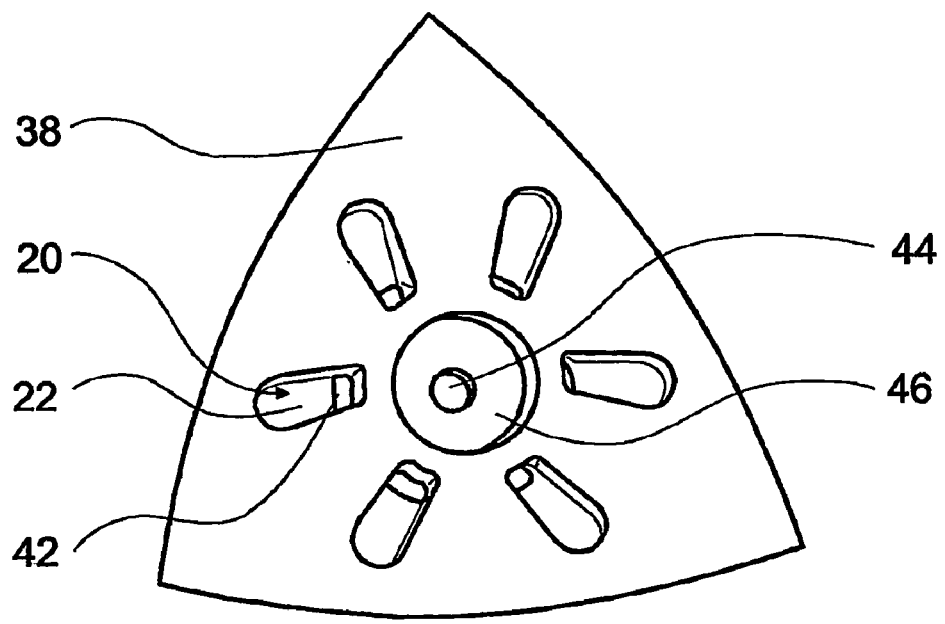

Shown are:

FIG. 1, a hand-held power tool in a side view, with one housing half removed;

FIG. 1A, a hand-held power tool in a side view, with one housing half removed, highlighting particular dimensions;

FIG. 2, an enlarged detail of the hand-held power tool in the region of the driven shaft with a sanding plate and a sandpaper, in a first view;

FIG. 3, the detail of FIG. 2 in a second view, without the sandpaper;

FIG. 4, the sanding plate of FIG. 2 from above;
FIG. 5, the sanding plate of FIG. 2 from below; and
FIG. 6, an enlarged detail of the hand-held power tool of FIG. 2, with a saw blade.

DESCRIPTION OF THE EXEMPLARY EMBODIMENT

FIG. 1 shows a hand-held power tool, embodied by a hand-guided sander, with a substantially L-shaped, longitudinally divided housing 10 and an electric motor 12, located in the housing 10, by way of which a driven shaft 16 extending from a front face end 14 of the housing 10 can be driven in oscillating fashion. On an underside of the housing 10, a suction conduit 18 is integrated with the housing 10 and extends in the longitudinal direction of the housing 10, to an outlet stub 28, at one end of the hand-held power tool facing away from the driven shaft 16 beginning at the face end 14 and according to the invention includes an intake opening at or in this face end. In the front region, angled by approximately 90°, the housing 10 has a smaller diameter than in the region of the electric motor 12. To compensate for this fluidically, the suction conduit 18, in the front, angled region of the hand-held power tool in the radial direction to the driven shaft 16, has a greater length than in the region of the electric motor 12 in the radial direction to the electric motor 12. In addition or alternatively to a longitudinal division, the housing 10 may also be embodied as divided crosswise; for instance, the housing 10 may be embodied with a front gearbox part.

In the direction toward the free end of the driven shaft 16, the suction conduit 18 adjoins the driven shaft 16 directly in a region following a bearing 30 and extends 360° around the driven shaft 16 and is extended in the manner of an annular conduit past a bearing flange 32 of the driven shaft 16, to the outside from the housing 10. On the face end 14, the suction conduit 18 forms an annular gap.

FIG. 1A is included to highlight particular dimensions of a radial extent from an outer edge of bearing flange (32) and an inner edge of housing (10). As shown in FIG. 1A, the bearing flange (32) extends 360° around the driven shaft (16) in a plane perpendicular to the longitudinal direction of the driven shaft (16). The bearing flange is defined by a radial distance $R_{bf}$ extending from an outer edge of the driven shaft (16) to an outer edge of the bearing flange (32). The suction conduit (18) operates as an intake, shaped as an annular gap on the face end (14) of the housing (10) between the bearing flange (32) of the driven shaft (16) and the housing (10) in the plane perpendicular to the longitudinal direction of the driven shaft (16).

The angular gap is formed by a radial distance $R_g$ between an outer edge of the bearing flange (32) facing the housing (10) in the plane perpendicular to the longitudinal direction of the driven shaft (16) and an inner edge of the housing (10) facing the bearing flange (32) and extending perpendicular to the face end (14) of the housing (10). The radial distance $R_g$ is measured in the plane perpendicular to the longitudinal direction of the driven shaft (16). The annular gap includes a radial extent that is defined by the radial distance $R_g$. The driven shaft (16) is defined by a radius $R_s$ extending from an axial center of the driven shaft (16) to an outer edge of the driven shaft (16). The radial extent of the annular gap is smaller than a diameter of the driven shaft (16) that is equal to two times the radius $R_s$.

In FIGS. 2 and 3, a tool receptacle formed by a sanding plate is secured to the driven shaft 16; it has a triangular base with convexly curved side edges (FIGS. 4 and 5). The tool receptacle has a support plate 40. The support plate 40 has a recess 44 at its center; it is attached by this recess to the driven shaft 16 and, with a fastening screw 34 screwed onto the driven shaft 16, is pressed in the axial direction against a bearing face of the bearing flange 32 of the driven shaft 16.

The tool receptacle furthermore has a rubber-elastic foamed plate part 36, which is secured to or foamed onto the support plate 40 on a side facing away from the hand-held power tool, and a hook-and-loop closure layer 38 is secured to the side of the plate part that faces away from the hand-held power tool.

The tool receptacle has six substantially L-shaped corresponding suction conduits 20, distributed uniformly over the circumference. Each of the suction conduits 20 has a respective tapering transverse conduit segment 22, extending radially inward from a radially outer region of the tool receptacle and extending essentially parallel to a sanding plane 24, and this transverse conduit segment is adjoined in the radially inner region by an axial conduit segment 42 that extends through a remainder of the foamed plate part 36 and through the support plate 40. The axial conduit segment 42 is spaced apart inward in the radial direction from a central recess 46 in the hook-and-loop closure layer 38 and in the plate part 36, so that radially inside each of the suction conduits 20 a respective annular rib segment is created, which can advantageously be used for holding a piece of sandpaper 48.

The transverse conduit segments 22 of the suction conduits 20 are embodied as open in the direction toward the sanding plane 24 and are not closed, except for suction extraction openings 50 in the sandpaper 48 in the direction of the sanding plane 24, until the sandpaper is installed. The suction extraction openings 50 in the sandpaper 48, when the sandpaper is installed, each come to coincide with the suction conduits 20 in their radially outer region. In principle, it would also be conceivable for the tool receptacle to have at least one already at least partly closed transverse conduit segment; for instance, a transverse conduit segment made in the support plate 40 could be closed by the foamed plate part 36 in the axial direction, and/or a transverse conduit segment made in the foamed plate part 36 could be produced as already at least partly closed in the axial direction by a core, and/or could be embodied as at least partly closed in the axial direction by the hook-and-loop closure layer 38.

The suction conduit 18 in the housing 10 of the hand-held power tool and the suction conduit 20 in the tool receptacle are coupled directly, that is, without an intervening component, via a region 26 that is open to the outside. The open region 26 is formed by an annular gap between the face end 14 of the housing 10 and a top side 52 of the tool receptacle. The spacing between the face end 14 of the housing 10 and the top side 52 of the tool receptacle, in the axial direction of the driven shaft 16, is preferably less than 15 mm, and especially preferably less than 5 mm, and in the present exemplary embodiment, it is 1 mm. The axial conduit segments 42 of the suction conduits 20 of the tool receptacle come to rest, upon installation of the tool receptacle, directly within the annular gap formed in the face end 14 by the suction conduit 18.

Figure 6:
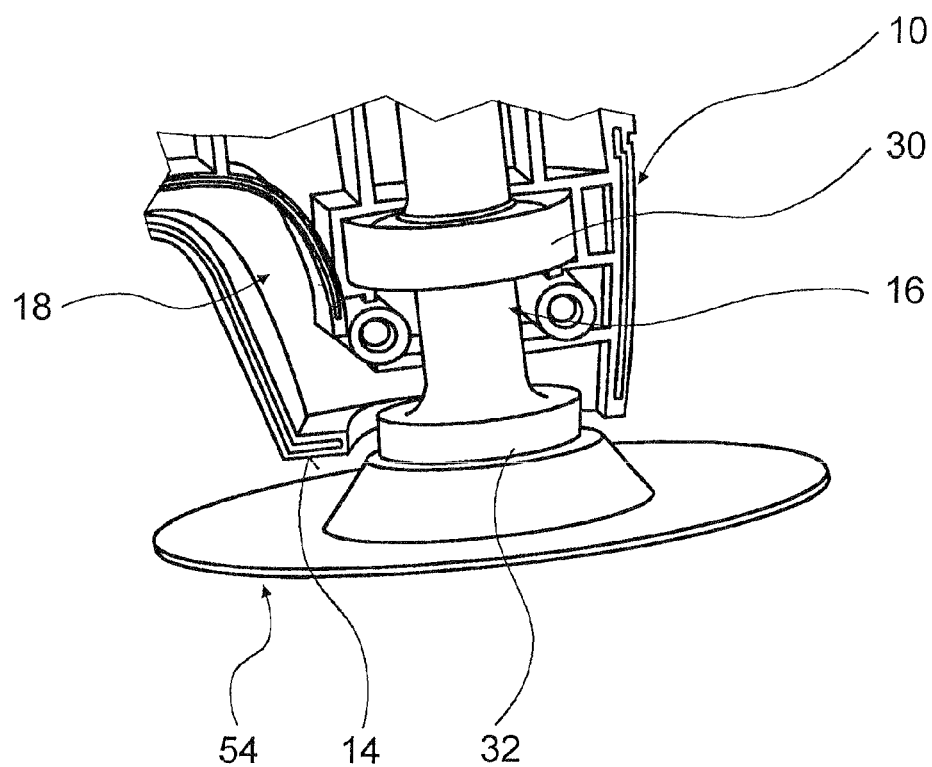

In FIG. 6, the hand-held power tool is shown with a tool 54 formed by a saw blade. In a corresponding use of the hand-held power tool, sawdust produced can likewise be vacuumed away via the suction conduit 18.

LIST OF REFERENCE NUMERALS

10 Housing
12 Motor
14 Face end
16 Driven shaft
18 Suction conduit

20 Suction conduit
22 Transverse conduit segment
24 Sanding plane
26 Region
28 Outlet stub
30 Bearing
32 Bearing flange
34 Fastening screw
36 Plate part
38 Hook-and-loop closure layer
40 Support plate
42 Axial conduit segment
44 Recess
46 Recess
48 Sandpaper
50 Suction extraction opening
52 Topside
54 Tool

The invention claimed is:

1. A hand-held power tool, in particular a sander, comprising a housing (10) and a motor (12), which is located in the housing (10) and by which a driven shaft (16), extending from a face end (14) of the housing (10), is drivable, the driven shaft (16) extending in a longitudinal direction, and further comprising a suction conduit (18), extending at least partway through the housing (10), wherein the suction conduit (18) extends in the longitudinal direction of the driven shaft (16) past a bearing flange (32) of the driven shaft (16) to an outside of the housing (10), wherein the bearing flange (32) extends 360° around the driven shaft (16) in a plane perpendicular to the longitudinal direction of the driven shaft (16), wherein the bearing flange is defined by a radial distance $R_{bf}$ extending from an outer edge of the driven shaft (16) to an outer edge of the bearing flange (32), wherein the suction conduit (18) operates as an intake, shaped as an annular gap on the face end (14) of the housing (10) between the bearing flange (32) of the driven shaft (16) and the housing (10) in the plane perpendicular to the longitudinal direction of the driven shaft (16), wherein the angular gap is formed by a radial distance $R_g$ between an outer edge of the bearing flange (32) facing the housing (10) in the plane perpendicular to the longitudinal direction of the driven shaft (16) and an inner edge of the housing (10) facing the bearing flange (32) and extending perpendicular to the face end (14) of the housing (10), wherein the radial distance $R_g$ is measured in the plane perpendicular to the longitudinal direction of the driven shaft (16), wherein the annular gap includes a radial extent that is defined by the radial distance $R_g$, wherein the driven shaft (16) is defined by a radius $R_s$ extending from an axial center of the driven shaft (16) to an outer edge of the driven shaft (16) and wherein the radial extent of the annular gap is smaller than a diameter of the driven shaft (16) that is equal to two times the radius $R_s$.

2. The hand-held power tool as recited in claim 1, wherein the suction conduit (18) extends, in at least one region, by at least 180° around the driven shaft (16).

3. The hand-held power tool as recited in claim 2, wherein the suction conduit (18) extends, in at least one region, by at least 360° around the driven shaft (16).

4. The hand-held power tool as recited in claim 1, wherein the suction conduit (18) has an inner radial limitation, in at least one region, which comprises a spacing of less than 1 cm from the driven shaft (16).

5. The hand-held power tool as recited in claim 4, wherein the suction conduit (18), in at least one region, directly adjoins the driven shaft (16).

6. The hand-held power tool as recited in claim 1, wherein the suction conduit (18) comprises a chamber portion extending from the face end (14) of the housing (10) in an axial direction of the driven shaft (16), the chamber portion surrounding the driven shaft (16).

7. The hand-held power tool as recited in claim 6, wherein after the chamber portion surrounding the driven shaft (16), the suction conduit (18) extends as a cavity along an underside of the motor (12) for the entire length of the motor (12).

8. The hand-held power tool as recited in claim 1, wherein the suction conduit (18) is integrated at an underside with the housing (10).

9. The hand-held power tool as recited in claim 1, wherein the suction conduit (18) extends in a longitudinal direction of the housing (10) from a housing end opposite the face end (14) that is proximate the driven shaft (16).

10. The hand-held power tool as recited in claim 1, wherein the suction conduit (18) extends from the face end (14) of the housing (10) to an exhaust end of the housing (10) comprising an outlet stub (28).

11. The hand-held power tool as recited in claim 1, wherein the housing (10) has a front part in which the driven shaft (16) is located and which has a bottom face comprising the face end (14),
wherein the housing (10) further comprises a main part that extends longitudinally in a main direction and which forms an angle with the longitudinal direction of the driven shaft (16),
wherein the suction conduit (18) extends in the front part and has a first radial extent perpendicular to the longitudinal direction of the driven shaft (16),
wherein the suction conduit (18) extends in the main part along the main direction and has a second radial extent perpendicular to the main direction, and
wherein the second radial extent in the main part is smaller than the first radial extend in the front part.

12. The hand-held power tool as recited in claim 1, wherein the suction conduit (18) is an annular conduit.

13. The hand-held power tool as recited in claim 1, wherein the suction conduit (18) extends past a bearing flange (32) of the driven shaft (16) to outside of the housing (10).

14. The hand-held power tool as recited in claim 1, wherein the suction conduit (18) comprises an annular gap.

15. A system comprising a hand-held power tool, in particular a sander, comprising a housing (10) and a motor (12), which is located in the housing (10) and by which a driven shaft (16), extending from a face end (14) of the housing (10), is drivable, the driven shaft (16) extending in a longitudinal direction, and further comprising a first suction conduit (18), extending at least partway through the housing (10), wherein the first suction conduit (18) extends in the longitudinal direction of the driven shaft (16) past a bearing flange (32) of the driven shaft (16) to an outside of the housing (10), wherein the first suction conduit (18) operates as an intake, shaped as an annular gap on the face end of the housing (10) between the bearing flange (32) of the driven shaft (16) and the housing (10) in a plane perpendicular to the longitudinal direction of the driven shaft (16), wherein the annular gap is formed by a radial distance $R_g$ between an outer edge of the bearing flange (32) facing the housing (10) in the plane perpendicular to the longitudinal direction of the driven shaft (16) and an inner edge of the housing (10) facing the driven shaft (16) and extending perpendicular to the face end (14) of the housing (10), wherein the radial distance $R_g$ is measured in the plane perpendicular to the longitudinal direction of the driven shaft (16), wherein the annular gap includes a radial extent that is defined by the radial distance $R_g$ wherein the driven shaft (16)

is defined by radius $R_s$ extending from an axial center of the driven shaft (16) to an outer edge of the driven shaft (16) and wherein the radial extent of the annular gap is smaller than a diameter of the driven shaft (10) that is equal to two times the radius $R_s$, the system further comprising a tool receptacle with a second suction conduit (20), wherein the first suction conduit (18) in the housing (10) of the hand-held power tool and the second suction conduit (20) in the tool receptacle are intended for direct coupling such that in an installed state of the tool receptacle, wherein the first suction conduit (18) and the second suction conduit (20) are coupled via a region (26) that is open in a radial direction towards the outside of the hand-held power tool and the tool receptacle, wherein the radial direction is perpendicular to the longitudinal direction of the driven shaft (16), wherein the region (26) extends between the face end (14) of the housing (10) and a top side (52) of the tool receptacle and wherein the top side (52) of the tool receptacle is oriented in an installed state of the tool receptacle towards the face end of the housing (10).

16. The hand-held power tool as recited in claim 15, wherein the open region (26) comprises an annular gap.

17. The handheld power tool as recited in claim 15, wherein a spacing extending in an axial direction between the face end (14) of the housing (10) and top side (52) of the tool receptacle is 1 mm.

\* \* \* \* \*